United States Patent [19]

Ohata et al.

[11] Patent Number: 5,430,103
[45] Date of Patent: Jul. 4, 1995

[54] CROSSLINKABLE COMPOSITION

[75] Inventors: Hiroyuki Ohata; Satoshi Terasaki, both of Takefu; Etsuo Minamino, Settsu; Masayasu Tomoda, Settsu; Yoshihiro Shirai, Settsu; Tsuyoshi Noguchi, Settsu; Kazuhisa Matsumoto, Settsu, all of Japan

[73] Assignees: Daikin Industries, Ltd., Osaka; Nissin Chemical Industry Co., Ltd., Fukui, both of Japan

[21] Appl. No.: 157,065

[22] PCT Filed: Apr. 8, 1993

[86] PCT No.: PCT/JP93/00451

§ 371 Date: Dec. 7, 1993

§ 102(e) Date: Dec. 7, 1993

[87] PCT Pub. No.: WO93/21271

PCT Pub. Date: Oct. 28, 1993

[30] Foreign Application Priority Data

Apr. 9, 1992 [JP] Japan .................. 4-118087

[51] Int. Cl.$^6$ .............. C08L 27/12; C08L 27/22; C08L 33/04; C08J 3/24
[52] U.S. Cl. ................... 525/194; 525/199; 525/200; 525/188
[58] Field of Search ............ 525/199, 200, 194

[56] References Cited

U.S. PATENT DOCUMENTS

| | | | |
|---|---|---|---|
| 4,045,402 | 8/1977 | Bjerk et al. | 525/199 |
| 4,581,412 | 4/1986 | Ohmori et al. | 525/199 |
| 4,614,779 | 9/1986 | Watanabe | 525/199 |
| 4,877,839 | 10/1989 | Conti-Ramsden | 525/200 |
| 4,988,548 | 1/1991 | Takemura et al. | 525/199 |
| 5,051,480 | 9/1991 | Coran | 525/227 |
| 5,053,450 | 10/1991 | Coran | 524/506 |
| 5,095,072 | 3/1992 | Kobayashi et al. | 525/199 |
| 5,100,734 | 3/1992 | Miyabayashi | 525/199 |
| 5,100,962 | 3/1992 | Sawada et al. | 525/199 |

FOREIGN PATENT DOCUMENTS 61-127711  6/1986  Japan.

Primary Examiner—Carman J. Seccuro, Jr.
Attorney, Agent, or Firm—Nikaido, Marmelstein, Murray & Oram

[57] ABSTRACT

The present invention provides a crosslinkable composition which comprises an internally crosslinked acrylic elastomer which is crosslinkable with a peroxide, a fluoroelastomer and a crosslinking agent for at least one of the elastomers.

A crosslinkable composition of the present invention can afford a molding which are excellent in physical properties such as mechanical strength and compression set, heat resistance and workability.

17 Claims, No Drawings

CROSSLINKABLE COMPOSITION

TECHNICAL FIELD

The present invention relates to crosslinkable compositions.

BACKGROUND ART

Fluoroelastomers are outstanding in resistance to heat, oils, chemicals, solvents, oxidation, etc. and are useful in the fields of industrial materials and for other applications. However, since economy is not negligible for the prevalent use of these elastomers, it is presently unexpectable that fluoroelastomers will be used in remarkably increased quantities despite their outstanding properties. Various co-crosslinkable blend compositions have been developed to overcome this problem, or to remedy the drawback of fluororubbers, that is, to improve the low-temperature flexibility thereof or to reduce the specific gravity thereof.

For example, it has been reported to merely blend an acrylic elastomer and a fluoroelastomer or to use additives for the blend in an attempt to develop a material having the characteristics of both the acrylic elastomer and fluoroelastomer, whereas the material obtained still remains to be improved in physical properties, such as mechanical strength and compression set, heat resistance, etc.

Further with respect to blends of fluororubber and acrylic rubber, attempts have been made to select a crosslinking agent for crosslinking both fluororubber and acrylic rubber, and prevent the impairment of physical properties of the two polymers or give improved workability to the blend as disclosed in JR-A-40558/1977, JP-A-146752/1978, JP-A-101847/1979, JP-A-154446/1979, JP-A-156052/1979, JP-A-23128/1980, JP-A-63740/1983, etc.

Nevertheless, even if fluororubber and acrylic rubber are merely blended or the crosslinking agent for crosslinking both the rubbers is used, difficulty is encountered in keeping these rubbers homogeneously dispersed with good stability, and the attempt fails to achieve a satisfactory effect in preventing the impairment of the mechanical strength and other properties.

To remedy these drawbacks, JP-A-299859/1989, for example, discloses the technique of substantially crosslinking acrylic rubber only when fluororubber and acrylic rubber are blended to thereby diminish the size of dispersed acrylic rubber particles and cause molecules of both the rubbers to penetrate into each other through the interface therebetween for the prevention of separation at the interface. However, this method is not amenable to quantity production and encounters difficulty in giving a blend of stabilized properties with ease.

An object of the present invention is to provide a method of readily preparing a crosslinkable composition capable of giving moldings which are excellent in physical properties such as mechanical strength and compression set, heat resistance and workability.

The present invention provides a crosslinkable composition which comprises an internally crosslinked acrylic elastomer which is crosslinkable with a peroxide, a fluoroelastomer and a crosslinking agent for at least one of the elastomers.

According to the present invention, an internally crosslinked acrylic elastomer which is crosslinkable with a peroxide is used in place of the conventional acrylic elastomer along with a fluoroelastomer. This readily provides a crosslinkable composition capable of giving moldings which are excellent in physical properties such as mechanical strength and compression set, heat resistance and workability.

According to the present invention, the internally crosslinked acrylic elastomer which is crosslinkable with a peroxide is obtained by copolymerizing an acrylic monomer or monomers with a crosslinkable monomer having, for example, at least two unsaturated bonds different in radical reactivity. In the crosslinkable monomer, the unsaturated group having the higher radical reactivity participates in the polymerization reaction, while the unsaturated group of the lower radical reactivity remains as it is in the side chain of the resulting polymer. Although the method of internal crosslinking is not limited specifically, the elastomer can be readily obtained by copolymerizing a multifunctional monomer with the acrylic monomer.

The internally crosslinked acrylic elastomer which is crosslinkable with a peroxide can be prepared from acrylic or methacrylic monomer, crosslinkable monomer and multifunctional monomer exemplified below by copolymerizing the combination of monomers by a known method of polymerization.

The (meth)acrylic monomer is represented by the general formula $CH_2=C(R_1)COOR_2$ wherein $R_1$ is a hydrogen atom or methyl, and $R_2$ is alkyl having 1 to 8 carbon atoms or alkoxy-substituted alkyl having 1 to 8 carbon atoms. Examples of such monomers are methyl (meth)acrylate, ethyl (meth)acrylate, propyl (meth)acrylate, butyl (meth)acrylate, methoxyethyl (meth)acrylate and ethoxyethyl (meth)acrylate.

Examples of useful crosslinkable monomers are vinylsilyl-containing compounds such as those represented by the following general formulae (1) to (6) wherein $R_1$ is a hydrogen atom or methyl. The crosslinkable monomer is used preferably in an amount of 0.1 to 10 parts by weight per 100 parts by weight of the combined amount of (meth)acrylic monomer, crosslinkable monomer and multifunctional monomer.

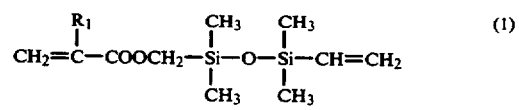

(1)

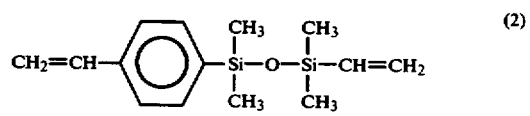

(2)

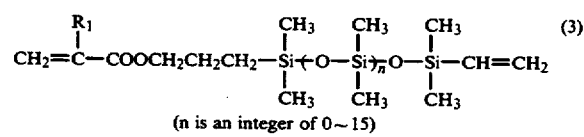

(3)

(n is an integer of 0~15)

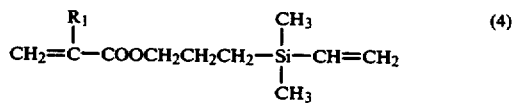

(4)

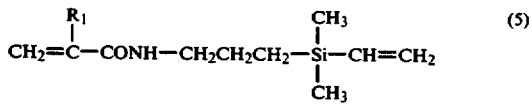

(5)

-continued

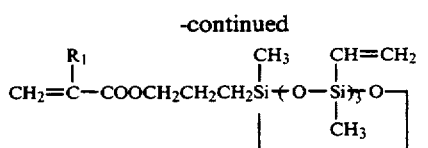

Examples of useful multifunctional monomers are allyl (meth)acrylate, ethylene glycol di(meth)acrylate, 1,4-butanediol di(meth)acrylate, 1,6-hexanediol di(meth)acrylate, divinylbenzene, polyethylene glycol di(meth)acrylate, trimethylolpropane tri(meth)acrylate, pentaerythritol tetra(meth)acrylate, etc. The multifunctional monomer is used in an amount of 0.1 to 10 parts by weight, preferably 0.3 to 7 parts by weight, per 100 parts by weight of the combined amount of (meth)acrylic monomer, crosslinkable monomer and multifunctional monomer. If the amount is less than 0.1 part by weight, the acrylic elastomer will be less than 30% in gel fraction, failing to give the desired properties. The gel fraction of the acrylic elastomer is preferably at least 50%. When required, a portion of the (meth)acrylic monomer may be replaced by an ethylenically unsaturated monomer, such as acrylonitrile, styrene, vinyl acetate or vinyl chloride, as copolymerized therewith, whereas the amount thereof is preferably up to 30 wt. % of the (meth)acrylic monomer.

Examples of useful fluoroelastomers are vinylidene fluoride/hexafluoropropylene, vinylidene fluoride/tetrafluoroethylene/hexafluoropropylene, vinylidene fluoride/chlorotrifluoroethylene and like vinylidene fluoride copolymers, tetrafluoroethylene/propylene, hexafluoropropylene/ethylene and fluoro(alkyl vinyl ether) (including those having a plurality of ether bonds)/olefin copolymers, fluorophosphazene rubber, etc. Preferable among these are vinylidene fluoride/hexafluoropropylene and vinylidene fluoride/tetrafluoroethylene/hexafluoropropylene elastomers.

With the present invention, the ratio of the acrylic elastomer to the fluoroelastomer, i.e., acrylic elastomer/fluoroelastomer, is by weight 5~90/95~10, preferably 10~70/90~30, more preferably 20~50/80~50, because if the proportion of the acrylic elastomer is too smaller, the improvement effect on economy is less and further because if the acrylic elastomer proportion is too greater, the impairment of physical properties becomes pronounced.

Crosslinking agents useful in the present invention for both the internally crosslinked acrylic elastomer which is crosslinkable with a peroxide and the fluoroelastomer are those generally used. Examples of those for the acrylic elastomer are organic peroxide compounds such as p-chlorobenzoyl peroxide, o-chlorobenzoyl peroxide, dichlorobenzoyl peroxide, benzoyl peroxide, dicumyl peroxide, 2,5-dimethyl-2,5-di(tert-butylperoxy)hexane, di-tert-butyl peroxide, tert-butyl perbenzoate, 1,1-di(tert-butylperoxy)-3,3,5-trimethyl-cyclohexane, 1,3-bis(tert-butylperoxyisopropyl)benzene, tert-butylperoxyisopropyl carbonate and the like. When required, an auxiliary crosslinking agent, such as ethylene glycol dimethacrylate, triallyl isocyanurate, triallyl cyanurate or N,N'-m-phenylenebismaleimide, can be used conjointly to achieve an improved crosslinking efficiently and afford improved physical properties. Crosslinking agents useful for the fluoroelastomer are, for example, organic peroxide, polyol, polyamine and like compounds.

The crosslinking agent is used in an amount which is usually used. For example, organic peroxide agents are used in an amount of about 0.1 to about 10 parts by weight per 100 parts by weight of the combined amount of acrylic elastomer and fluoroelastomer.

According to the present invention, fillers, processing aids, antioxidants, age resistors, antiozonants, ultraviolet absorbers, etc. can be added to the composition when required.

Examples of useful fillers are magnesium oxide, calcium oxide, titanium oxide, silicon oxide, aluminum oxide and like metal oxides, magnesium hydroxide, aluminum hydroxide, calcium hydroxide and like metal hydroxides, magnesium carbonate, aluminum carbonate, calcium carbonate, barium carbonate and like carbonates, magnesium silicate, calcium silicate, sodium silicate, aluminum silicate and like silicates, aluminum sulfate, calcium sulfate, barium sulfate and like sulfates, molybdenum disulfide, iron sulfide, copper sulfide and like metal sulfides, kieselguhr, asbestos, lithopone (zinc sulfide/barium sulfate), graphite, carbon black, carbon fluoride, calcium fluoride, coke, etc.

Examples of processing agents are stearic acid, oleic acid, palmitic acid, lauric acid and like higher fatty acids, sodium stearate, zinc stearate and like higher fatty acid salts, stearic acid amide, oleic acid amide and like higher fatty acid amides, ethyl oleate and like higher fatty acid esters, stearylamine, oleylamine and like higher aliphatic amines, carnauba wax, ceresin wax and like petroleum wax, ethylene glycol, glycerin, diethylene glycol and like polyglycols, vaseline, paraffin and like aliphatic hydrocarbons, silicone oil, silicone polymers, low-molecular-weight polyethylene, phthalic acid esters, phosphoric acid esters, rosin, (halogenated) dialkylamines, (halogenated) dialkylsulfones, surfactants, etc.

Examples of antioxidants, age resistors and antiozonants are 2,5-di-tert-amylhydroquinoline and like phenolic compounds, N-phenyl-$\beta$-naphthylamine, aromatic secondary amines and like amine compounds, and 6-ethoxy-2,2,4-trimethyl-1,2-dihydroquinoline and like quinoline compounds.

Examples of ultraviolet absorbers are 2,4-dihydroxybenzophenone and like benzophenone compounds, bis(2,2,6,6-tetramethyl-4-piperidyl)sebacate and like amine compounds, 2-(2'-hydroxy-5'-methylphenyl)benzotriazole and like benzotriazole compounds.

The composition of the present invention is prepared using a usual mixing device. For example, the acrylic elastomer, fluoroelastomer and other components are kneaded by an open roll mill, closed mixer or the like.

The composition of the invention has various uses. For example, it is suitable for packings, O-rings, hoses, other seals, diaphragms and valves which are resistant to oils, chemicals, heat, steam or weather for motor vehicles, ships, aircraft and like transport means, for similar packings, O-rings, seals, diaphragms, valves, hoses, rolls, tubes, coatings resistant to chemicals and linings for chemical plants, similar packings, O-rings, hoses, seals, belts, diaphragms, valves, rolls and tubes for food plant apparatus and food devices (including household utensils), similar packings, O-rings, hoses, seals, diaphragms, valves and tubes for atomic plant devices or apparatus, similar packings, O-rings, hoses, seals, diaphragms, valves, rolls, tubes, linings, mandrels, electric wires or cables, flexible joints, belts, rubber sheets and weather strips for general industrial parts, rolls blades for PPC copying machines, etc.

BEST MODE OF CARRYING OUT THE INVENTION

The invention will be described with reference to the following examples, in which the parts and percentages merely referred to as such are by weight.

EXAMPLES 1 TO 8

A fluoroelastomer, acrylic elastomer, crosslinking agent, etc. were kneaded in the amounts listed in Table 1 in an open roll mill to obtain each of crosslinkable compositions. These compositions were vulcanized at 160° C. for 10 minutes by a press and further vulcanized at 180° C. for 4 hours in an oven. Dai-el G-801 is an iodine-containing two-component copolymer fluoroelastomer prepared from vinylidene fluoride (2F) and hexafluoropropylene (6F). Dai-el G-701 is a two-component elastomer comprising vinylidene fluoride and hexafluoropropylene and containing a polyol vulcanizing agent and auxiliary vulcanizing agent. P-1 to P-4 are acrylic elastomers each having the composition and gel fraction listed in Table 5. Seast 116 is carbon black of the MAF type manufactured by Tokai Carbon Co., Ltd. Perhexa 2.5B is a peroxide manufactured by Nippon Oils & Fats Co., Ltd., TAIC is triallyl isocyanurate, Naugard 445 is an age resistor manufactured by Uniroyal Chemical Co., Ltd. Sumifine BM is N,N'-m-phenylenebismaleimide manufactured by Sumitomo Chemical Co., Ltd. and C-13 is a peroxide manufactured by Shin-Etsu Chemical Co., Ltd.

TABLE 1

| | Example | | | | | | | |
|---|---|---|---|---|---|---|---|---|
| | 1 | 2 | 3 | 4 | 5 | 6 | 7 | 8 |
| Fluoroelastomer | | | | | | | | |
| Dai-el G-801 | 70 | 50 | 70 | 70 | 70 | | | |
| Dai-el G-701 | | | | | | 70 | 70 | 50 |
| Acrylic elastomer | | | | | | | | |
| P-1 | 30 | 50 | | | | | 30 | 50 |
| P-2 | | | 30 | | | | | |
| P-3 | | | | 30 | | | | |
| P-4 | | | | | 30 | 30 | | |
| (*a) | 1.5 | 1.5 | 0.5 | 5 | 1.5 | 1.5 | 1.5 | 1.5 |
| Seast 116 | 22 | 30 | 22 | 15 | 22 | 22 | 22 | 30 |
| Perhexa 2.5B | 1.5 | 1.5 | 1.5 | 1.5 | 1.5 | | | |
| TAIC | 2.8 | 2 | 2.8 | 2.8 | 2.8 | | | |
| Magnesium oxide | | | | | | 2.1 | 2.1 | 1.5 |
| Calcium hydroxide | | | | | | 4.2 | 4.2 | 3 |
| Naugard 445 | 0.6 | 0.8 | 0.6 | 0.6 | 0.6 | 0.6 | 0.6 | 1 |
| Sumifine BM | | | 0.5 | | | | | |
| C-13 | | | 1 | | | | | |

(*a) % of multifunctional monomer copolymerized in acrylic elastomer

The compositions as vulcanized were checked for physical properties according to JIS K6301. Table 2 shows the results.

TABLE 2

| | Example | | | | | | | |
|---|---|---|---|---|---|---|---|---|
| | 1 | 2 | 3 | 4 | 5 | 6 | 7 | 8 |
| Properties | | | | | | | | |
| 100% Modulas | 73 | 115 | 49 | 98 | 65 | 91 | 97 | 103 |
| Tensile strength (kg/cm$^2$) | 185 | 162 | 180 | 152 | 169 | 155 | 164 | 145 |
| Elongation (%) | 290 | 160 | 330 | 180 | 310 | 210 | 190 | 140 |
| Hardness (JIS A) | 78 | 80 | 75 | 81 | 76 | 77 | 79 | 79 |
| Compression set (%) (*1) | 16 | 22 | 20 | 15 | 18 | 23 | 21 | 30 |
| Resistance to engine oil (*2) | +3.7 | +6.5 | +3.5 | +3.8 | +4.1 | +3.9 | +3.3 | +3.0 |
| Thermal aging resistance (*3) | | | | | | | | |
| Tensile strength change (%) | −4 | +12 | −6 | +5 | −10 | +7 | +1 | +10 |
| Elongation change (%) | +3 | +6 | ±0 | +22 | +5 | −10 | −16 | −7 |
| Hardness change (point) | +4 | +4 | +4 | +2 | +6 | +5 | +4 | +6 |

*1: 150° C. × 70 hours
*2: Oil used Showa Shell Formula X 5W-30 Immersion conditions 175° C. × 70 hours Volume swell (%)
*3: 200° C. × 140 hours

Comparative Example 1 and 2

A fluoroelastomer, acrylic elastomer not internally crosslinked (P-5, Table 5), crosslinking agent, etc. were kneaded in the amounts given in Table 3 by an open roll mill to obtain each of crosslinkable compositions. These compositions were vulcanized at 160° C. for 10 minutes by a press and further vulcanized at 180° C. for 4 hours in an oven.

TABLE 3

| | Comparative Example | |
|---|---|---|
| | 1 | 2 |
| Fluoroelastomer | | |
| Dai-el G-801 | 70 | |
| Dai-el G-701 | | 70 |
| Acrylic elastomer | | |
| P-5 | 30 | 30 |
| Seast 116 | 22 | 22 |
| Perhexa 2.5B | 1.5 | |
| TAIC | 2.8 | |
| Magnesium oxide | | 2.1 |
| Calcium hydroxide | | 4.2 |
| Naugard 445 | 0.6 | 0.6 |

The compositions as vulcanized were checked for physical properties according to JIS K6301. Table 4 shows the results.

TABLE 4

| | Comparative Example | |
|---|---|---|
| | 1 | 2 |
| Properties | | |

TABLE 4-continued

|  | Comparative Example | |
|---|---|---|
|  | 1 | 2 |
| 100% Modulas | 33 | 56 |
| Tensile strength (kg/cm²) | 162 | 121 |
| Elongation (%) | 270 | 150 |
| Hardness (JIS A) | 78 | 77 |
| Compression set (%) (*1) | 25 | 41 |
| Resistance to engine oil (*2) | +3.9 | +3.5 |
| Thermal aging resistance (*3) | | |
| Tensile strength change (%) | −31 | −35 |
| Elongation change (%) | +4 | −26 |
| Hardness change (point) | +5 | +10 |

*1: Same as in Table 2
*2: Same as in Table 2
*3: Same as in Table 2

TABLE 5

| Acryllic elastomer | P-1 | P-2 | P-3 | P-4 | P-5 |
|---|---|---|---|---|---|
| Composition (%) | | | | | |
| Ethyl acrylate | 97.5 | 98.5 | 94.5 | 67.5 | 99.0 |
| Butyl acrylate | — | — | — | 30.0 | — |
| AV-100 (*4) | 1.0 | 1.0 | 0.5 | 1.0 | 1.0 |
| 1,4-Butanediol diacrylate | 1.5 | — | 5.0 | 1.5 | — |
| Trimethylolpropane triacrylate | — | 0.5 | — | — | — |
| Gel fraction (%) (*5) | 95 | 78 | 98 | 93 | 0.3 |

(*4) AV-100: Compound of the formula (7) below

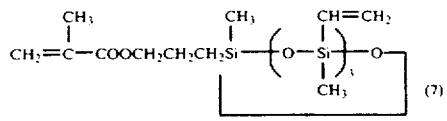

(*5) Gel fraction

About 0.5 g of the sample was accurately weighed out, placed into a measuring flask and dissolved in methyl ethyl ketone to prepare a solution in an amount of 200 ml as accurately measured. The solution was allowed to stand at room temperature for 24 hours, thereafter thoroughly shaken and stirred, and further allowed to stand at room temperature for 24 hours. The supernatant of the solution was collected and centrifuged at 1500 r.p.m. for 20 minutes. The resulting supernatant was accurately weighed out. After evaporating off an excess of methyl ethyl ketone on water bath, the residue was dried in an oven at 105°±5° C. for 3 hours.

Gel fraction (%) = [1 − A(mg) × 10/B(mg)] × 100
A: Weight of dry product
B: Weight of sample

INDUSTRIAL APPLICABILITY

A crosslinkable composition of the present invention can afford moldings which are excellent in physical properties such as mechanical strength and compression set, heat resistance and workability.

We claim:

1. A composition comprising:
   a peroxide cross linkable fluoroelastomer reactant; and
   an internally crosslinked acrylic elastomer reactant, which is reactive with said fluoroelastomer, comprising the reaction product of:
   an acrylic monomer which is an acrylic or methacrylic ester;
   a multifunctional monomer which is internally reacted with said acrylic monomer to cross link it; and
   a vinylsilyl containing cross linkable compound monomer, which is different from said multifunctional monomer and which reacts with said acrylic monomer and with said fluoroelastomer, selected from at least one member of the group consisting of the following formulae (1) to (6), in which each $R_1$, respectively, comprises hydrogen or methyl, and n is an integer of 0 to 15:

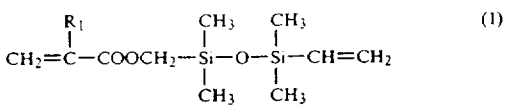

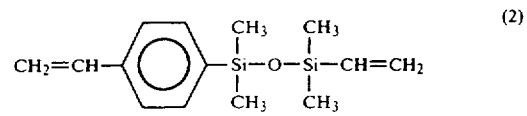

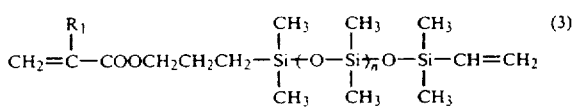

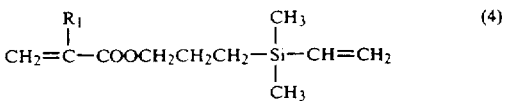

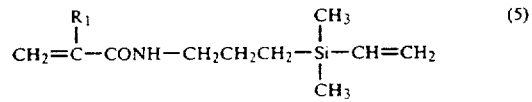

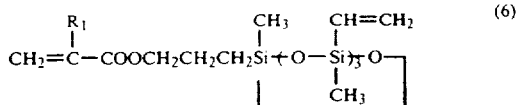

wherein said vinylsilyl compound monomer is partially internally reacted with said acrylic monomer and said multifunctional monomer such that said reaction product retains reactive cites derived from said vinylsilyl moiety which are reactable with said fluoroelastomer; and wherein at least one of said fluoroelastomer or said acrylic elastomer is cross linkable by reaction with a peroxide.

2. A composition as defined in claim 1 wherein the acrylic monomer is represented by the general formula $CH_2 = C(R_1)COOR_2$, wherein $R_1$ is a hydrogen atom or methyl, and $R_2$ is alkyl having 1 to 8 carbon atoms or alkoxy-substituted alkyl having 1 to 8 carbon atoms.

3. A composition as defined in claim 1 wherein the multifunctional monomer is at least one member selected form the group consisting of allyl (meth)acrylate, ethylene glycol di(meth)acrylate, 1,4-butanediol di(meth)acrylate, 1,6-hexane di(meth)acrylate, divinyl benzene, polyethylene glycol di (meth) acrylate, trimethylol propane tri (meth) acrylate, and pentaerythritol tetra (meth) acrylate.

4. A composition as defined in claim 1 wherein the fluoroelastomer is at least one member selected form the group consisting of vinylidene fluoride/hexafluoro propylene copolymer, vinylidene fluoride/tetrafluoro ethylene/hexafluoro propylene terpolymer, vinylidene fluoride/chlorotrifluoro ethylene copolymer, tetrafluoro ethylene/propylene copolymer, fluoro(alkyl vinyl ether) /olefin copolymer, and fluorophosphazene rubber.

5. A composition as defined in claim 1 wherein the crosslinkable monomer is used in an amount of 0.1 to 10 parts by weight per 100 parts by weight of the combined amount of acrylic monomer, crosslinkable monomer and multifunctional monomer.

6. A composition as defined in claim 1 wherein the multifunctional monomer is used in an amount of 0.1 to 10 parts by weight per 100 parts by weight of the combined amount of acrylic monomer, crosslinkable monomer and multifunctional monomer.

7. A composition as defined in claim 1 wherein the ratio of the acrylic elastomer/fluoroelastomer is 5~90/95~10 by weight.

8. A composition as defined in claim 1 further comprising an organic peroxide cross linking agent which is present in an amount of 0.1 to 10 parts by weight per 100 parts by weight of the combined amount of said acrylic elastomer and said fluoroelastomer.

9. A composition as claimed in claim 4 wherein said alkyl vinyl ether has a plurality of ether bonds.

10. A peroxide crosslinked reaction product of:
a peroxide cross linkable fluoroelastomer;
a peroxide cross linking agent; and
an acrylic elastomer comprising an internally cross linked reaction product of:
an acrylic monomer which is an acrylic or methacrylic ester;
a multifunctional monomer which is internally reacted with said acrylic to produce a cross linked product; and
a vinylsilyl containing cross linkable compound monomer, which is different from said multifunctional monomer, selected from at least one member of the group consisting of the following formulae (1) to (6), in which each $R_1$, respectively, comprises hydrogen or methyl, and n is an integer of 0 to 15:

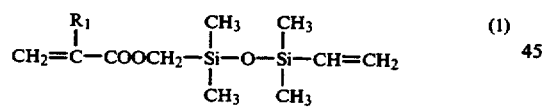

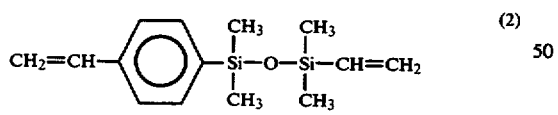

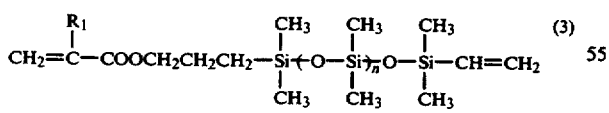

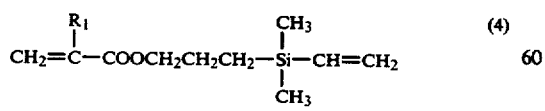

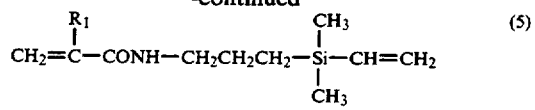

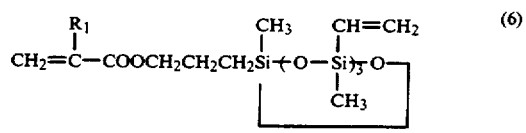

and which is partially reacted with said acrylic monomer and said multifunctional monomer such as to cause said internally cross linked acrylic elastomer reaction product to possess functionality sufficient to react with said fluoroelastomer.

11. A reaction product as claimed in claim 10 wherein said acrylic monomer is an ester of the formula:

$$CH_2=C(R_1) COOR_2$$

wherein $R_1$ is hydrogen or methyl, and $R_2$ is selected from the group consisting of alkyl of 1 to 8 carbon atoms and alkoxy substituted alkyl having 1 to 8 carbon atoms, 12. A reaction product as defined in claim 10 wherein the multifunctional monomer is at least one member selected form the group consisting of allyl (meth)acrylate, ethylene glycol di(meth)acrylate, 1,4-butanediol di(meth)acrylate, 1,6-hexane di(meth)acrylate, divinyl benzene, polyethylene glycol di(meth)acrylate, trimethylol propane tri(meth)acrylate, and pentaerythritol tetra(meth)acrylate.

13. A reaction product as defined in claim 10 wherein the fluoroelastomer is at least one member selected form the group consisting of vinylidene fluoride/hexafluoro propylene copolymer, vinylidene fluoride/tetrafluoro ethylene/hexafluoro propylene terpolymer, vinylidene fluoride/chlorotrifluoro ethylene copolymer, tetrafluoro ethylene/propylene copolymer, fluoro(alkyl vinyl ether)/olefin copolymer, and fluorophosphazene rubber.

14. A reaction product as claimed in claim 10 wherein said cross linkable monomer comprises 0.1 to 10 parts by weight per 100 parts by weight of the combined weight of said acrylic monomer, cross linkable monomer and multifunctional monomer.

15. A reaction product as claimed in claim 10 wherein said multifunctional monomer comprises 0.1 to 10 parts by weight per 100 parts by weight of the combined weight of said acrylic monomer, cross linkable monomer and multifunctional monomer.

16. A reaction product as claimed in claim 10 wherein the weight ratio of said acrylic elastomer to said fluoroelastomer is 5 to 90 parts of acrylic elastomer to 95 to 10 parts of fluoroelastomer.

17. A reaction product as defined in claim 10 wherein said peroxide cross linking agent is organic and is present in an amount of 0.1 to 10 parts by weight per 100 parts by weight of the combined weight of said acrylic elastomer and said fluoroelastomer.

* * * * *